United States Patent [19]
Goharrizi

[11] Patent Number: 6,024,013
[45] Date of Patent: Feb. 15, 2000

[54] MACHINE FOR DISPENSING HOT FOOD PRODUCTS, PARTICULARLY PIZZAS

[76] Inventor: Masoud Zandi Goharrizi, P° Castellana 121—7° B, Esc. Izda, 28046 Madrid, España, Spain

[21] Appl. No.: 09/194,338
[22] PCT Filed: Mar. 26, 1997
[86] PCT No.: PCT/ES97/00080
§ 371 Date: Nov. 24, 1998
§ 102(e) Date: Nov. 24, 1998
[87] PCT Pub. No.: WO98/43213
PCT Pub. Date: Oct. 1, 1998
[51] Int. Cl.[7] .............. A47J 37/00; G07F 9/10; G07F 11/00
[52] U.S. Cl. .............. 99/327; 99/357; 99/352; 99/427; 99/443 R; 219/388; 219/400
[58] Field of Search ............ 99/326–335, 352–355, 99/357, 426, 427, 443 R, 443 C, 447–450, 477–479, 476; 126/21 A, 20; 219/388, 400, 401; 221/150 R, 150 A, 150 HC; 426/523

[56] References Cited

U.S. PATENT DOCUMENTS

| | | |
|---|---|---|
| 2,834,510 | 5/1958 | Cenotti . |
| 4,944,218 | 7/1990 | Cresson ........................ 99/357 |
| 5,113,754 | 5/1992 | Robinson et al. ............... 99/326 |
| 5,144,879 | 9/1992 | Alessi . |
| 5,522,310 | 6/1996 | Black . |
| 5,540,943 | 7/1996 | Naramura ................... 426/274 |
| 5,606,904 | 3/1997 | Fabbri ........................ 99/326 |

FOREIGN PATENT DOCUMENTS

| | | |
|---|---|---|
| 0 708 421 | 4/1996 | European Pat. Off. . |
| 1 031 185 | 5/1996 | Spain . |
| WO 92 07340 | 4/1992 | WIPO . |
| WO 92 07341 | 4/1992 | WIPO . |

*Primary Examiner*—Timothy Simone
*Attorney, Agent, or Firm*—Robert M. Schwartz

[57] ABSTRACT

The machine comprises a refrigerating store (2) which is provided with a series of columns (3) wherein are piled annular dishes (4) which contain the precooked product (1), columns(3) which are supported by a rotary platform (5) and which can rotate with respect to a fixed platform (7) situated at the bottom, the rotary platform (5) having a series of openings (6) wherein are located the extreme dishes corresponding to one column (3); parallel to the fixed platform (7) a sliding plate (8) is provided which has an opening (6) in which falls the plate (4) in a situation facing the opening (10) of the rotary platform (5), also having a lower fixed plate (9) on which the sliding plate (8) can move thereby displacing the plate, and which is provided with a cavity (11) for the passage of a vertically displaceable horizontal support (12) which pushes the product (1) till it is introduced into an oven (14).

3 Claims, 3 Drawing Sheets

MACHINE FOR DISPENSING HOT FOOD PRODUCTS, PARTICULARLY PIZZAS

OBJECT OF THE INVENTION

The present invention refers to a dispensing machine for hot food products, preferably precooked, especially pizzas, which are originally piled in different columns distributed in a refrigerator store, from which, prior product selection by a consumer, they are transferred to an oven where they are rapidly heated, then being ejected towards the external tray.

An object of this invention is that the dispensing machine for hot food products has the means necessary to separate and supply the product selected from one of the storage columns, as well as means of support and transport to direct said product to a specially configured oven.

Likewise, an object of the invention is the displacement and transport device introducing and supporting the food product inside the oven during heating, likewise provided by this device.

BACKGROUND OF THE INVENTION

There are several dispensing machines on the market used for the distribution of liquid or solid food products, using different methods to facilitate the selection and dispatch of the product chosen by the consumer after introducing the corresponding coins.

A type of dispensing machine is known in which the products to be supplied are normally housed in different compartments of a tower or vertical column in which products of the same type are grouped, whether bags of crisps, chocolates or other products, to which the user has access by an external tray over which the product falls after introducing the coins and pressing the selector for said product.

In other embodiments, it is contemplated that the dispensing machine has the products grouped in the compartments of some rotating horizontal stores located at different levels, which rotate after pressing the corresponding button, until placing one of the products available opposite the exit through which the user introduces his/her hand after passing a normally foldable door providing access to the product selected.

As may be verified, the applications of the dispensing machines are different as are the solutions for storage, selection and dispatch of the product, finding internal mechanisms, normally developed according to requirements of effectiveness and operational simplicity, applicable to dispensing machines for a type of product not requiring any other treatment than its storage and distribution.

When the product concerned to be dispensed requires heat treatment, whether for its cold preservation or heating, as is the case in this last example of dispensing machine for hot drinks, it is necessary for the machine to incorporate, as well as the mechanical means for selection and transport, heating or cooling components, conveniently located according to the intended operation sequence.

Starting from the extended acceptance of this type of dispensing machine, the development of a series of internal mechanisms situated according to operational mechanisms for the dispatch of a specific food product becomes viable, its design normally being conditioned by the different stages from the introduction of the coin until obtaining the product.

Specifically, the development of a series of mechanisms configuring a machine permitting previously precooked hot food to be dispensed, especially pizzas or similar products, makes the invention described below viable.

DESCRIPTION OF THE INVENTION

The automatic dispensing machine for hot food products, object of this invention, covers the expectations expressed completely satisfactorily by means of incorporating a series of internal mechanisms permitting the selection of the product desired, its transport to an oven where it is rapidly heated and its dispatch to the outside tray to which the consumer has access.

The dispensing machine incorporates a refrigerator store in which there is a series of columns in which the food products are grouped, preferably pizzas or similar products, according to the ingredients they contain.

These columns display some means for opening with easy access, preferably in their upper part, through which a series of plates with a special configuration are introduced and piled and inside of which the product is to be found.

The plates have a spacious pod of ring shape defined by walls slightly higher than the product, to prevent contact between pizzas when one plate is piled on top of another.

In their walls, said plates have a series of holes facilitating refrigeration of the product they contain, contributing to their thermal uniformity.

Each one of the mentioned columns housing the piled plates are preferably configured by a series of rods fixed to a circular rotating platform, each one of the columns being arranged, in a variable number, uniformly distributed at a constant distance from the center of the platform, and arranged opposite to each other with an ample, normally circular, passer opening in which the lower plate of the pile is housed.

The rotating platform is mobile with respect to a slightly separated lower base platform showing a preferably quasi-circular shape limited by a straight side, incorporating in the same plane and parallel to this straight side, a plate displaceable in a longitudinal sense, initiated below the rotating platform which is likewise slightly separated.

Hence, the plates containing the product will be found freely housed inside the mentioned passer openings of the rotating platform and supported over the fixed platform, except one of the end plates of its pile which will be supported over the displaceable plate.

Intended product selection will provoke rotation of the mobile platform and the positioning of the column corresponding to said product over the sliding plate, the end plate being supported over this plate.

The sliding plate has an ample circular opening which is displaced until opposite the plate supported over its surface, such that the latter will fall inside this opening in which it will freely situate itself, in turn resting over a lower fixed plate slightly separated from the sliding plate.

The sliding plate drags the plate during its movement towards the sector containing the oven, normally situated at a higher level.

In this sector, the base plate incorporates a recess with a diameter, practically similar to the diameter of the plate aperture, the base plate recess and the plate hole being enabled to facilitate the passage of a support interlocked to a vertically displaceable shank, determining the pushing of the support over the product contained in the plate directing it upwards inside the oven.

The support incorporates a base and a series of support pivots which slightly protrude with respect to said base on which the product is arranged, as well as also counting with some internal resistances over the base, contributing to heating the lower face of the product.

Likewise, the oven houses some heating resistances uniformly distributed over its upper and side faces which heat the circulating air transmitting heat to the product.

Product heating will take place for a short period of time, approximately one minute, it being foreseen that the oven switches on when the coin is introduced to achieve its preheating until the normal operating temperature.

Once the product has been heated, it is removed from the oven by the corresponding pushing devices situated in a preferable transverse arrangement, which transport the heated product to the exit tray.

As from this moment, the shank-support assembly, firstly, and then the sliding plate, return to their original position.

DESCRIPTION OF THE DRAWINGS

To complement the description being made and with the purpose of helping an improved understanding of the invention characteristics, this specification is accompanied by a set of drawings as an integral part thereof, which illustrate without limiting the following.

PREFERRED EMBODIMENT OF THE INVENTION

Figure 1:
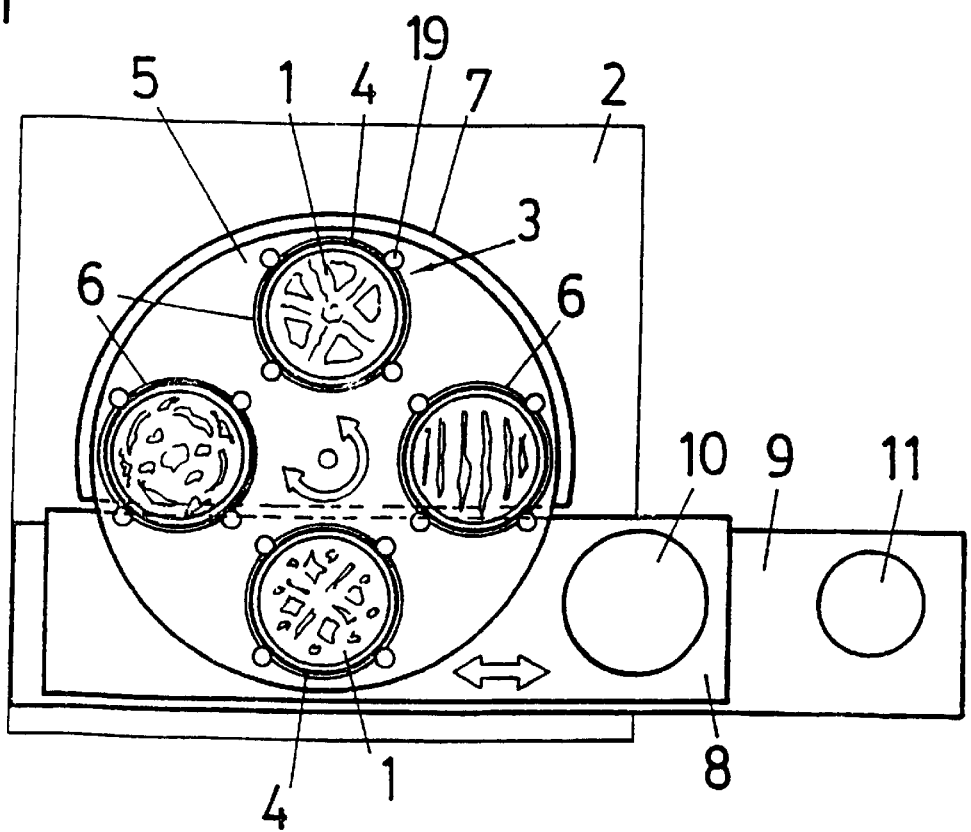
FIG. 1. This shows a plan view of the plate column store in which the rotating platform and sliding plate are seen.
Figure 2:
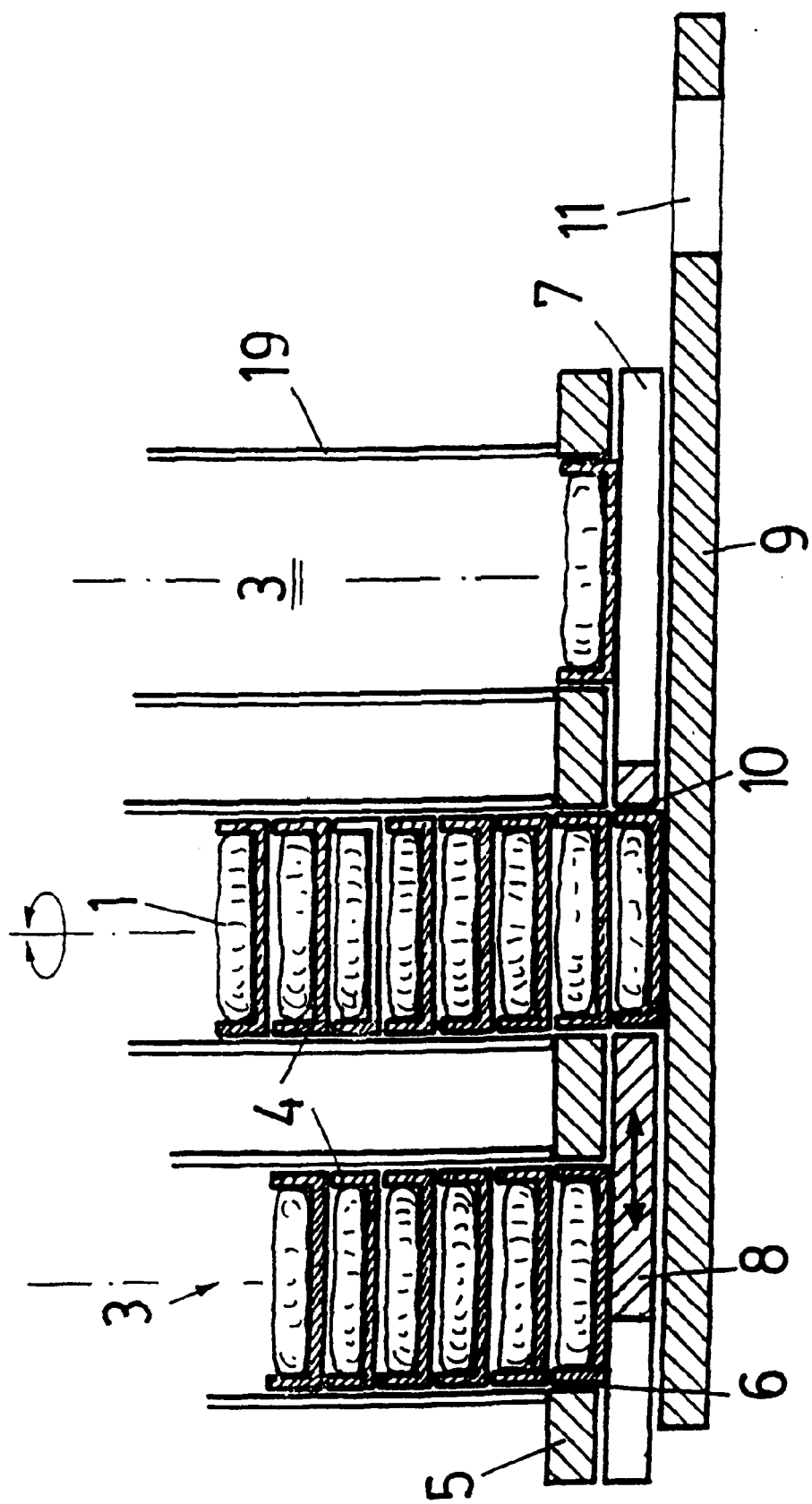
FIG. 2. This shows a side view of the plate column store, in which the rotating platform, fixed platform, sliding and fixed plates are represented, with one of the plates incorporated in the sliding plate opening for its transfer to the oven.
Figure 3:
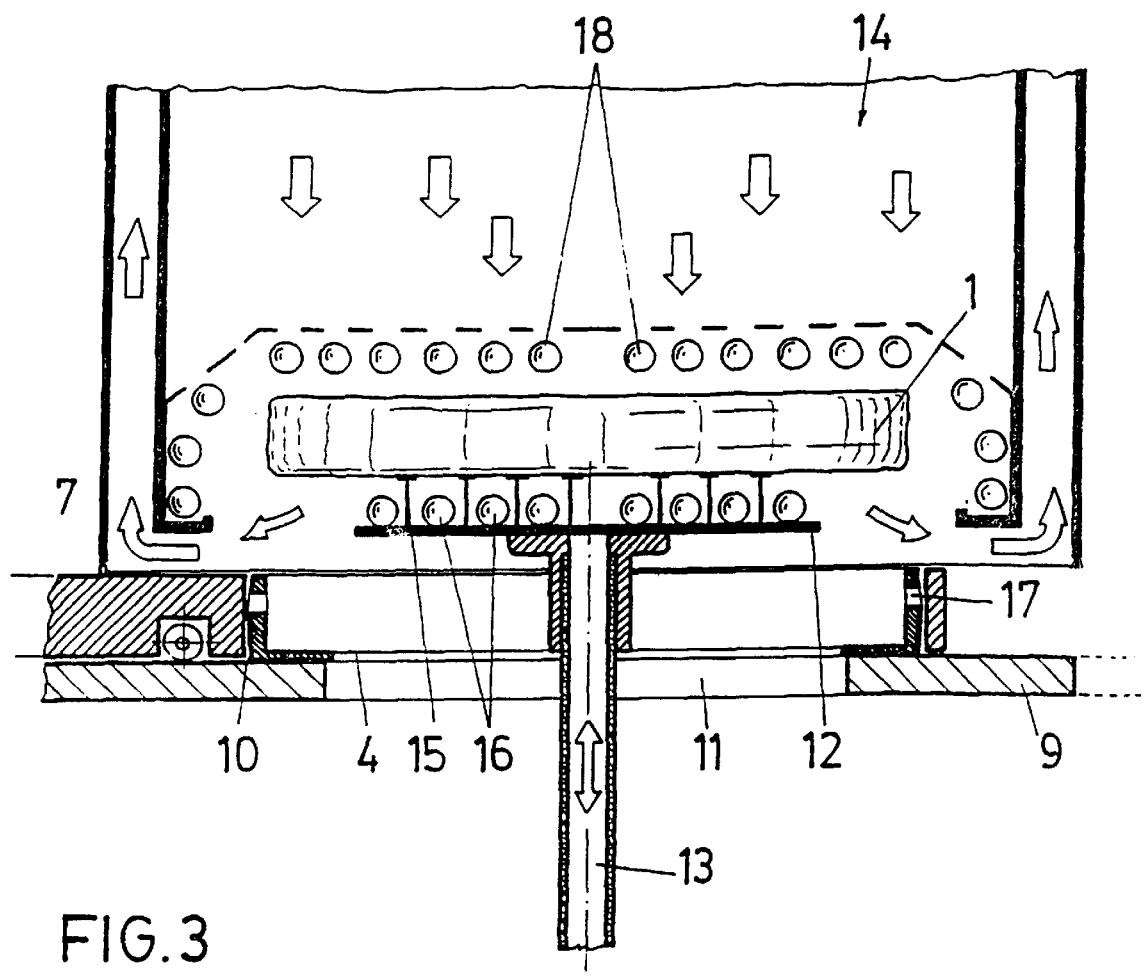
FIG. 3. This shows a side view of the support and shank, the product leaning over the support in its position inside the oven during heating.

In the light of the figures a preferred embodiment is described for the automatic dispensing machine for hot food products, particularly pizzas, applicable for the supply of hot products prior the introduction of coins and selection of the product grouped according to its ingredients in a same piled arrangement, being different from others, because it includes a refrigerator store (2) having a series of columns (3) in which some plates (4) are piled internally, with a ring shape and containing the precooked product (1), columns (3) supported by a rotating platform (5) with respect to a fixed platform (7) located below the rotating platform (5), having a series of apertures (6) with a diameter slightly greater than the diameter of the end plate corresponding to a piled arrangement of plates of the column (3), being located in some plane and parallel to the fixed platform (7), a sliding plate (8), displaceable longitudinally with respect to a lower fixed plate (9), the sliding plate (8) counting with an opening (10) over which the plate (4) falls in its position opposite the opening (6) of the rotating platform (5), it being foreseen that the fixed plate (9) incorporates a recess (11) of less diameter than that of the plate (4) enabled for the passage of an assembly consisting of a horizontal interlocked support (12) and shank (13), which push the product (1) leaning over the support (12) until its introduction in an oven (14) having uniformly distributed resistances (18) for heating the air flow transmitting heat to the product (1).

The rotating platform (5) has a circular shape with its uniformly distributed apertures (6) in equidistant arrangement to the center of the platform (5).

The columns (3) are defined by a series of vertical rods (19) limiting the piled arrangement of the plates (4).

The plate (4) incorporates a series of holes (17) in its side wall destined to level the temperature of the product (19 it contains.

The horizontal support (12) incorporates a base body from which a series of support pivots (15) extend over which the product (19 to be heated rests, as well as having over its base body a series of heating resistances (16).

It is not considered necessary to extend this description any longer for any expert in the subject to understand the scope of the invention and the advantages derived from it.

The material, shape, size and arrangement of the components will be susceptible of variation, provided they do not basically alter the invention.

The terms in which this report is described should always be interpreted in the widest and non-restricting sense.

I claim:

1. A dispensing machine for hot food products, said products including precooked pizzas grouped according to ingredients, each said product on a plate in a piled arrangement, comprising a refrigerator store (2) having a series of columns (3), for receiving one or more of said plates (4) in stacked arrangement in each said column, each said plate having a ring shape containing said precooked product (1), said columns (3) supported by a rotating platform (5), a fixed platform (7) located below said rotating platform (5), said rotating platform (5) having one or more openings (6), which are uniformly distributed in an equidistant arrangement to the center of said rotating platform (5), said openings (6) having a diameter slightly greater than the diameter of one of said plates, said columns (3) formed in part by vertical rods (19), said openings (6) located on the same plane of said platform (5) and parallel to said fixed platform (7), a sliding plate (8), below and parallel said fixed platform (7), displaceable longitudinally with respect to a fixed lower platform (9), said sliding plate (8) having an opening for receiving a said plate (4) at position opening (10) when said rotating platform (5) and said opening (10) are in vertical alignment, said platform (9) having a recess (11) of less diameter than a said plate (4), a horizontal support (12) and an interlocked shank (13), constructed and arranged for vertical displacement through recess (11) for receiving said product (1) on support (12) and introduction of said product into an oven (14), said oven having uniformly distributed resistances (18) for heating the air and transmitting heat to said product (1).

2. A dispensing machine according to claim 1, further comprising each of said plates (4) having a plurality of openings (17) in its side wall.

3. A dispensing machine according to claim 1, further comprising a horizontal support (12) which includes a plurality of support pivots (15) for supporting said product and said horizontal support (12) further supporting a series of said heating resistances (16).

* * * * *